(12) United States Patent
Oka et al.

(10) Patent No.: US 6,567,096 B1
(45) Date of Patent: *May 20, 2003

(54) IMAGE COMPOSING METHOD AND APPARATUS

(75) Inventors: Masaaki Oka, Kanagawa (JP);
Yasuharu Takenaka, Kanagawa (JP);
Takasi Takemoto, Kanagawa (JP);
Junichi Fujita, Saitama (JP);
Masaharu Yoshimori, Tokyo (JP)

(73) Assignee: Sony Computer Entertainment Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,607

(22) Filed: Aug. 10, 1998

(30) Foreign Application Priority Data

Aug. 11, 1997  (JP) .............................................. 9-216843

(51) Int. Cl.[7] .................................................. G09G 5/02
(52) U.S. Cl. ........................ 345/592; 345/629; 345/593; 345/630
(58) Field of Search ................................ 345/419, 425, 345/435, 592, 593, 629, 630

(56) References Cited

U.S. PATENT DOCUMENTS

| 5,351,067 | A | * | 9/1994 | Lumelsky et al. | 345/435 |
|---|---|---|---|---|---|
| 5,414,529 | A | * | 5/1995 | Terada et al. | 345/435 |
| 5,444,835 | A | * | 8/1995 | Turkowski | 345/435 |
| 5,638,499 | A | * | 6/1997 | O'Connor | 345/435 |

* cited by examiner

Primary Examiner—Mark Zimmerman
Assistant Examiner—Kimbinh T. Nguyen
(74) Attorney, Agent, or Firm—Lerner, David, Littenberg, Krumholz & Mentlik, LLP

(57) ABSTRACT

An image composing method and apparatus is provided which can compose a mixed image with no increased hardware scale and no reduced processing speed.

A subtracting means (13) is used to calculate a difference in pixel value between a first image and a second image, each having three color information components and one additional information component. Each of the first and second image pixel values may have all the pixel values of zero. The result of subtraction is multiplied by a mixing factor in a multiplying means (15). For the mixing factor, any one of the additional information components or fixed values of the first and second image pixel values are selected. The components are of a same value. In a adding means 17, any of two image pixel values is added to the result of multiplication to produce a mixed image.

6 Claims, 5 Drawing Sheets

IMAGE COMPOSING METHOD AND APPARATUS

BACKGROUND OF THE INVENTION

1. Field of the Invention

The present invention relates to a method of, and apparatus for, mixing a plurality of images to compose a new image.

2. Description of Related Art

In the fields of industry including graphic computer, game machine, video equipment, etc., a plurality of images is mixed together according to an information on a predetermined mixing ratio to compose a new image.

FIG. 1 schematically illustrates how two images are mixed to compose a new image. In this example, a first image 41 and a second image 42 are multiplied in pixel value by 0.5, respectively, and they are added together to compose a third image 43. More particularly, a triangular part 41A of the first image 41 and a left half 41L of the second image 42 are multiplied in density by 0.5 and superposed one on the other to produce the third image 43. The third image 43 is a composite image.

For such an image composition, there have been proposed various methods different in number of images to be added together, application of mixing ratio information, etc. Among the conventional methods, "OpenGL" is considered to be the substantially standard interface in the field of computer graphics. The following description will be made based on the "OpenGL".

It should be appreciated that the prototype of the "OpenGL" was made by the SiliconGraphics in the United States of America, and the "OpenGL" is under the management of the Architecture Review Board (ARB) for the OpenGL.

Assume here that the first image has a pixel value Cs while the second image has a pixel value Cd. The pixel values Cs and Cd are expressed as follows:

$$Cs = (Rs, Gs, Bs, As) \quad (1)$$

$$Cd = (Rd, Gd, Bd, Ad) \quad (2)$$

where Rs, Gs and Bs are pixel color information of the first image and correspond to red (R), green (G) and blue (B), respectively; As is an additional information of the first image pixel, also called "alpha information"; Rd, Gd and Bd are pixel color information of the second image and correspond to red (R), green (G) and blue (B), respectively; Ad is an additional information of the second image pixel, also called "alpha information".

Since the image data is generally represented in units of 8 bits, the above three color information components are represented with 24 units. In various data equipment in which image data are handled in units of 32 bits, for example, however, a blank channel for 8 bits will take place. The blank channel for 8 bits is used to handle the additional information As and Ad along with the color information.

The first image is mixed with the second images with the first image multiplied by a mixing factor S represented by any one of the following eight expressions (3-1) to (3-8):

$$S = (0, 0, 0, 0), \text{ or} \quad (3\text{-}1)$$
$$= (1, 1, 1, 1), \text{ or} \quad (3\text{-}2)$$
$$= (Rd, Gd, Bd, Ad), \text{ or} \quad (3\text{-}3)$$
$$= (1, 1, 1, 1) - (Rd, Gd, Bd, Ad), \text{ or} \quad (3\text{-}4)$$
$$= (As, As, As, As), \text{ or} \quad (3\text{-}5)$$
$$= (1, 1, 1, 1) - (As, As, As, As), \text{ or} \quad (3\text{-}6)$$
$$= (Ad, Ad, Ad, Ad), \text{ or} \quad (3\text{-}7)$$
$$= (1, 1, 1, 1) - (Ad, Ad, Ad, Ad) \quad (3\text{-}8)$$

Similarly, the second image is mixed with the first images with the second image multiplied by a mixing factor D represented by any one of the following eight expressions (4-1) to (4-8):

$$D = (0, 0, 0, 0), \text{ or} \quad (4\text{-}1)$$
$$= (1, 1, 1, 1), \text{ or} \quad (4\text{-}2)$$
$$= (Rs, Gs, Bs, As), \text{ or} \quad (4\text{-}3)$$
$$= (1, 1, 1, 1) - (Rs, Gs, Bs, As), \text{ or} \quad (4\text{-}4)$$
$$= (As, As, As, As), \text{ or} \quad (4\text{-}5)$$
$$= (1, 1, 1, 1) - (As, As, As, As), \text{ or} \quad (4\text{-}6)$$
$$= (Ad, Ad, Ad, Ad), \text{ or} \quad (4\text{-}7)$$
$$= (1, 1, 1, 1) - (Ad, Ad, Ad, Ad) \quad (4\text{-}8)$$

Therefore, the first and second image are mixed in 64 different expressions (8×8 expressions of the mixing factor).

The pixel value Cb of an image resulted from the above mixing is given by the following expression (5). However, it should be noted that the expression (5) should be calculated for each component.

$$Cb = Cs*S + Cd*D \quad (5)$$

FIG. 2 shows an example of the configuration of the image mixing circuit which use the expression (5) to make a calculation for the mixing of two images.

In FIG. 2, the reference MUX51 indicates a means for selecting any one of 8 mixing factors given by the expressions (3-1) to (3-8), and the reference MUX53 indicates a means for selecting any one of 8 mixing factors given by the expressions (4-1) to (4-8). The means MUX51 outputs a mixing factor S for the first image to a multiplying means 52 in which it is multiplied by the pixel value Cs of the first image. The means MUX53 outputs a mixing factor D for the second image to a multiplying means 54 in which it is multiplied by the pixel value Cd of the second image.

Outputs from the multiplying means 52 and 54 are added together in an adding means 55 to produce a composite image (Cs*S+Cd*D).

For production of a composite image using the expression (5), two times of multiplication and one addition are required for each image component.

Generally, the multiplication takes a longer time than the addition and the circuit scale of a multiplier is larger than that of an adder. Therefore, when the image mixing circuit is configured to make a calculation of image mixing for all possible combinations of the mixing factors S and D, the hardware scale will be too large.

SUMMARY OF THE INVENTION

Accordingly, the present invention has an object to overcome the above-mentioned drawbacks of the prior art by providing an image composing method and apparatus capable of a high speed calculation with no increased hardware scale.

The above object can be accomplished by providing a method of mixing first and second images to produce a composite image, comprising, according to the present invention, a first step of multiplying the first image pixel value by a first factor, a second step of multiplying the second image pixel value by a second factor, and a step of adding the first image pixel value multiplied by the first factor and the second image pixel value multiplied by the second factor, any one of the first and second factors being 1 or 0, alternatively, the sum of the two factors being 1.

The above object can also be accomplished by proving a method of mixing first and second images to produce a composite image, comprising, according to the present invention, a step of making a subtraction between the first and second image pixel values to determine a pixel value difference, a step of multiplying the result of the subtraction by a selected mixing factor, and a step of adding the result of the multiplication to the pixel value of any selected one of the first and second images.

The above object can also be accomplished by providing an apparatus for mixing first and second images to produce a composite image, comprising, according to the present invention, a first means for multiplying the first image pixel value by a first factor, a second means for multiplying the second image pixel value by a second factor, and means for adding the first image pixel value multiplied by the first factor and the second image pixel value multiplied by the second factor, any one of the first and second factors being 1 or 0, alternatively, the sum of the two factors being 1.

The above object can also be accomplished by proving an apparatus for mixing first and second images to produce a composite image, comprising, according to the present invention, means for making a subtraction between the first and second image pixel values to determine a pixel value difference, means for multiplying the result of the subtraction by a selected mixing factor, and means for adding the result of the multiplication to the pixel value of any selected one of the first and second images.

The present invention can provide an image composing method and apparatus adapted to make a high speed calculation with no increased hardware scale.

BRIEF DESCRIPTION OF THE DRAWINGS

These objects and other objects, features and advantages of the present intention will become more apparent from the following detailed description of the present invention when taken in conjunction with the accompanying drawings, of which.

DETAILED DESCRIPTION OF THE PREFERRED EMBODIMENTS

Figure 1:
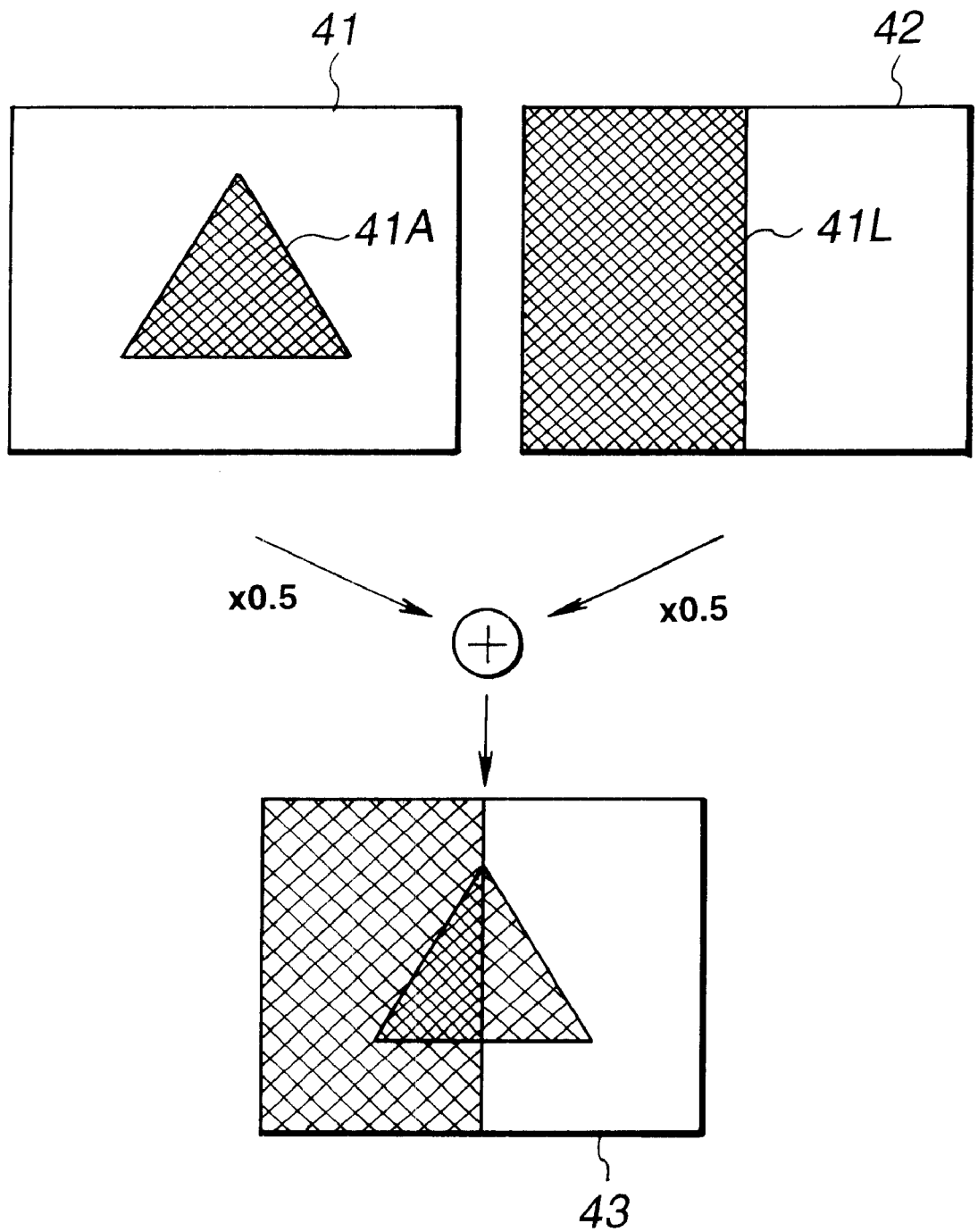
FIG. 1 is an explanatory illustration of how two images are mixed to compose a new image.
Figure 2:
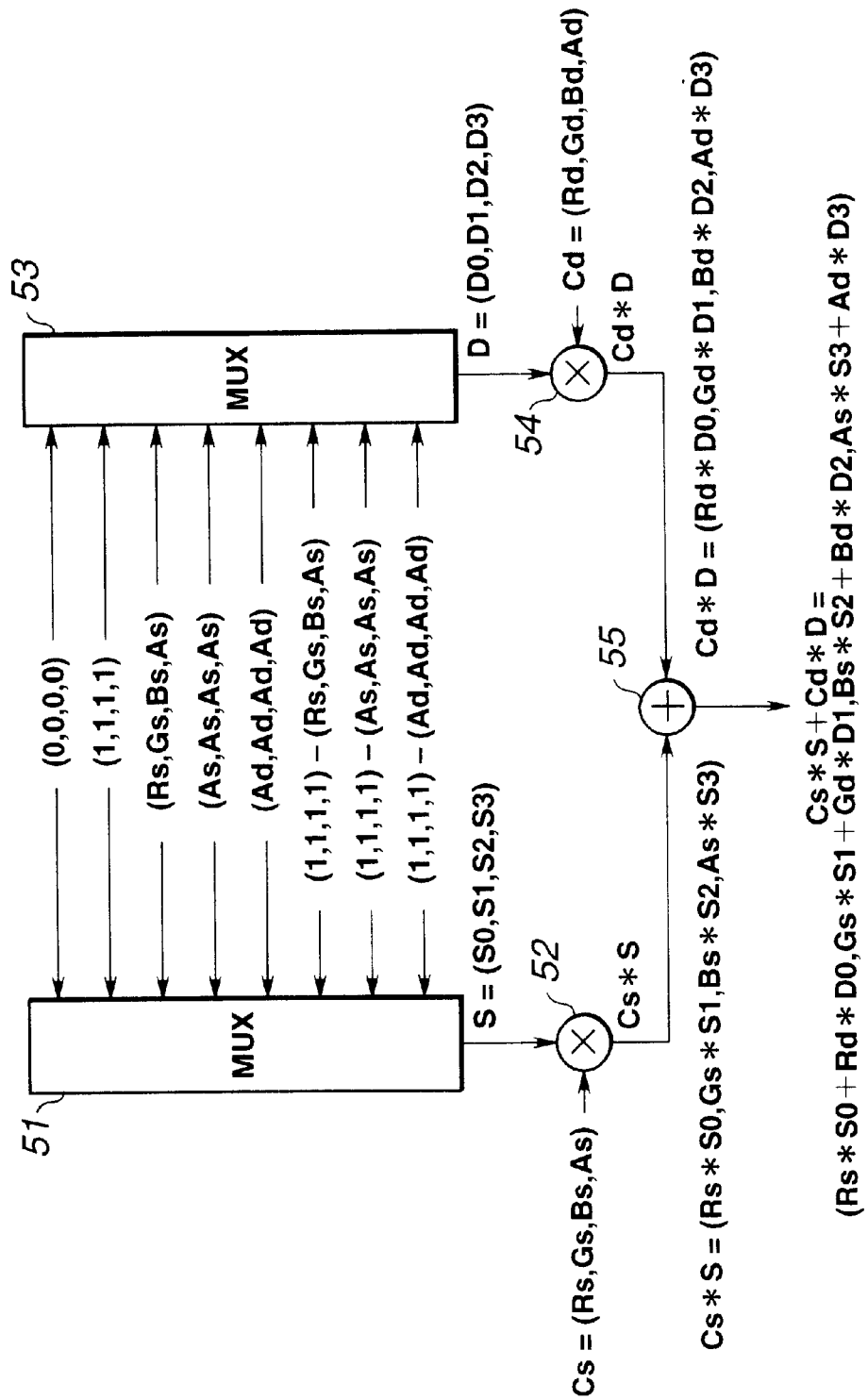
FIG. 2 is also an explanatory illustration of a conventional image mixing circuit.

In the "OpenGL" being taken as the standard interface of the computer graphics as mentioned above, eight kinds of mixing factor are defined for each of two images which are to be mixed together for production of a composite image. Therefore, the mixing factors are combined with each other in 64 ways (8×8).

Of the 64 combinations, however, only those having a physical means are normally used. All the 64 combinations are rarely used in practice. Therefore, the image mixing method and apparatus can be considered to have a practically sufficient function if they can mix images with such combinations of mixing factors having the physical means.

The present invention provides an image mixing method and apparatus adapted to select only certain ones of the 64 combinations of mixing factors for calculation of image data, for image mixing calculation with no increased hardware scale.

The first image pixel value $Cs$ and second image pixel value $Cd$ are represented as previously mentioned by the expressions (1) and (2):

$$Cs = (Rs, Gs, Bs, As) \quad (1)$$

$$Cd = (Rd, Gd, Bd, Ad) \quad (2)$$

The pixel value $Cb$ of a composite image produced through mixing of the two images is given by the aforementioned expression (5) using a mixing factor $S$ by which the first image is multiplied for mixing with the second image and a mixing factor $D$ by which the second image is multiplied for mixing with the first image.

$$Cb = Cs*S + Cd*D \quad (5)$$

Next, a specific combination with a mixing factor in the image composing method according to the present invention will be described concerning its physical meaning.

For combination of mixing factors for mixing of two images in the present invention, ten ways including from <Combination 1> to <Combination 10> are selected as will be described below.

<Combination 1>

$S = (As, As, As, As)$ $D = (1, 1, 1, 1) - (As, As, As, As)$

This combination is used for addition of the first and second images with weighting it with the mixing factor for the first image.

<Combination 2>

$S = (1, 1, 1, 1) - (Ad, Ad, Ad, Ad)$ $D (Ad, Ad, Ad, Ad)$

This combination is used for addition of the first and second images with weighting it with the mixing factor for the second image.

<Combination 3>

$S = (fix, fix, fix, fix)$ $D = (1, 1, 1, 1) - (fix, fix, fix, fix)$

This combination is used for addition of the first and second images with weighting it with a fixed mixing factor.

<Combination 4>

$S = (fix, fix, fix, fix)$ $D = (1, 1, 1, 1)$

This combination is used for addition of the first image multiplied by a fixed mixing factor and the second images.

<Combination 5>

S=(As, As, As, As)
D=(1, 1, 1, 1)
This combination is used for addition of the first image multiplied by a mixing factor for the first image and the second image.
<Combination 6>
S=(−fix, −fix, −fix, −fix)
D=(1, 1, 1, 1)
This combination is used for subtraction of the first image multiplied by a fixed mixing factor, from the second image.
<Combination 7>
S=(−As, −As, −As, −As)
D=(1, 1, 1, 1)
This combination is used for subtraction of the first image multiplied by the mixing factor for the first image, from the second image.
<Combination 8>
S=(1, 1, 1, 1)
D=(−fix, −fix, −fix, −fix)
This combination is used for subtraction of the second image multiplied by the fixed mixing factor, from the first image.
<Combination 9>
S=(As, As, As, As)
D=(0, 0, 0, 0)
The combination is used for multiplying the first image by the mixing factor for the first image.
<Combination 10>
S=(1, 1, 1, 1)
D=(1, 1, 1, 1)
This combination is used for addition of the first and second images.

As seen from the above description, the factors S and D are in a complementary relation in a significantly applicable combination of mixing factors. That is, S+D=1 or S or D=0 or 1.

The image composing method according to the present invention in which two images are mixed together in the above-mentioned 10 combinations of the mixing factors to produce a composite image, will further be described.

For the production of composite image, calculation is done using the expression (6) below:

$$(A-B)*C+D \qquad (6)$$

where, A=Cs or Cd or 0,
B=Cs or Cd or 0,
C=As or Ad or fix (fixed value),
D=Cd or Cs or 0;
however, Cs=(Rs, Gs, Bs, As),
Cd=(Rd, Gd, Bd, Ad),
As=(As, As, As, As),
Ad=(Ad, Ad, Ad, Ad),
0=(0, 0, 0, 0) and fix=(fix, fix, fix, fix)
It should be noted that the calculation is done for each component.

Using the expression (6), it is possible to calculate image data for image composition by a multiplication, subtraction and addition for each image component. The number of times of multiplication can be smaller than that in the conventional calculation using the aforementioned expression (5).

The expression (6) can be used to rewrite the 10 combination of mixing factors in the <Combination 1> to <Combination 10> as shown below:

<Combination 1>
A=Cs, B=Cd, C=As, D=Cd
As*Cs+(1−As)*Cd
=(Cs−Cd)*As+Cd
={(Rs−Rd)*As+Rd,
(Gs−Gd)*As+Gd,
(Bs−Bd)*As+Bd,
(As−Ad)*As+Ad}
<Combination 2>
A=Cd, B=Cs, C=Ad, D=Cs
(1−Ad)*Cs+Ad*Cd
=(Cd−Cs)*Ad+Cs
={(Rd−Rs)*Ad+Rs,
(Gd−Gs)*Ad+Gs,
(Bd−Bs)*Ad+Bs,
(Ad−As)*Ad+As}
<Combination 3>
A=Cs, B=Cd, C=fix, D=Cd
fix*Cs+(1−fix)*Cd
=(Cs−Cd)*fix+Cd
={(Rs−Rd)*fix,+Rd,
(Gs−Gd)*fix,+Gd,
(Bs−Bd)*fix+Bd,
(As−Ad)*fix+Ad}
<Combination 4>
A=Cs, B=0, C=fix, D=Cd
fix*Cs+Cd
=(Cs−0)*fix+Cd
={(Rs−0)*fix+Rd,
(Gs−0)*fix+Gd,
(Bs−0)*fix+Bd,
(As−0)*fix+Ad}
<Combination 5>
A=Cs, B=0, C=As, D Cd
As*Cs+Cd
=(Cs−0)*As+Cd
={(Rs−0)*As+Rd,
(Gs−0) As+Gd,
(Bs−0) As+Bd,
(As−0) As+Ad}
<Combination 6>
A=0, B=Cs, C=fix, D=Cd
Cd−fix*Cs
=(0−Cs)*fix+Cd
={(0−Rs)*fix+Rd,
(0−Gs)*fix+Gd,
(0−Bs)*fix+Bd,
(0−As)*fix+Ad)
<Combination 7>
A=0, B=Cs, C=As, D=Cd
(Cd−As*Cs
=(0−Cs)*As+Cd
={(0−Rs)*As+Rd,
(0−Gs)*As+Gd,
(0−Bs)*As+Bd,
(0−As)*As+Ad}
<Combination 8>
A=0, B=Cd, C=fix, D=Cs
Cs−fix*Cd
=(0−Cd)*fix+Cs
={(0−Rd)*fix+Rs, (0−Gd)*fix+Gs,
(0−Bd)*fix+Bs,
(0−Ad)*fix+As}
<Combination 9>
A=Cs, B=0, C=As, D=0
As*Cs
=(Cs−0)*As+0
={(Rs−0)*As+0,
(Gs−0)*As+0,
(Bs−0)*As+0,
(As−0)*As+0 }
<Combination 10>
A=Cs, B=0, C=fix=1, D=Cd
Cs+Cd
=(Cs−0)*1+Cd
={(Rs−0)*1+Rd,
(Gs−0)*1+Gd,
(Bs−0)*1+Bd,
(As−0)*1+Ad}

Next, the embodiment of the image composing apparatus according to the present invention will be described below.

Figure 3:
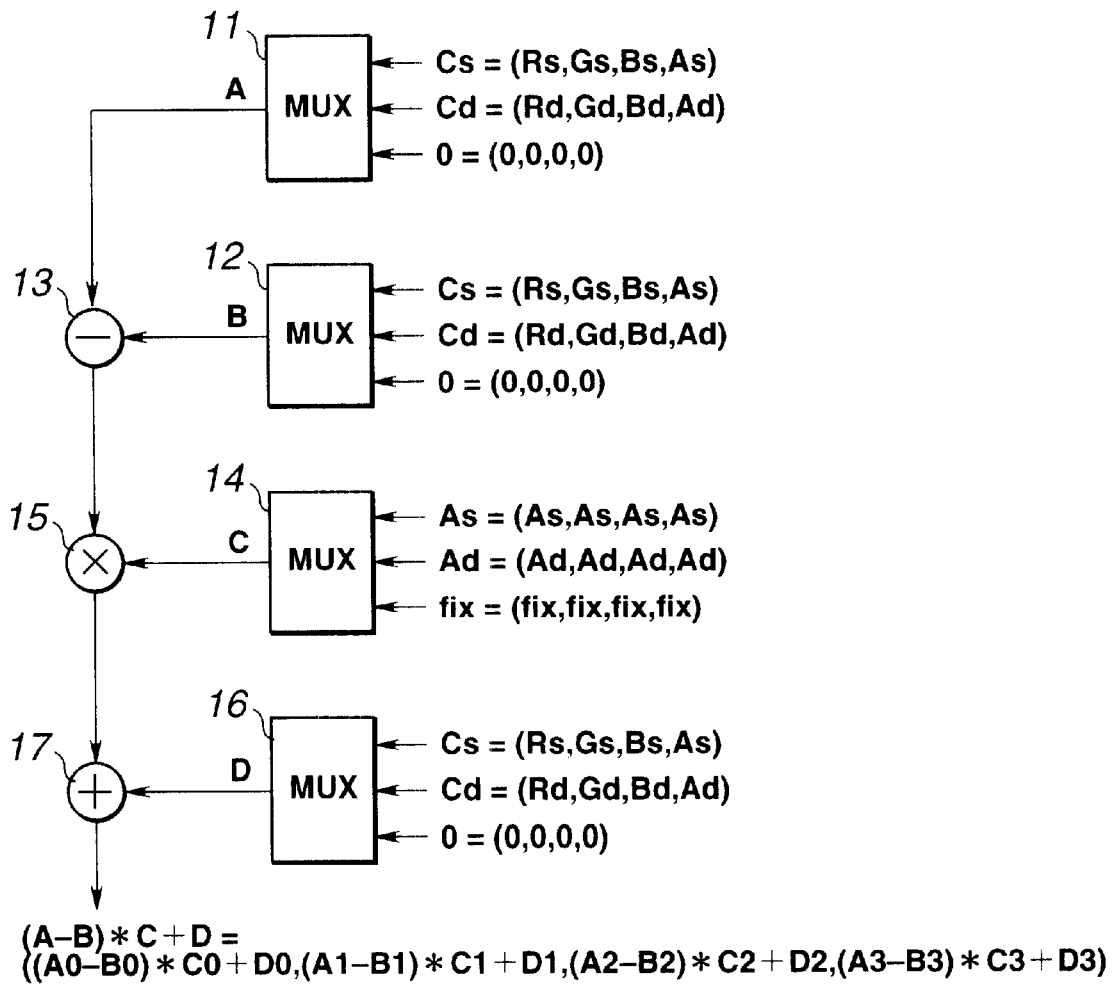
FIG. 3 is an illustration of the basic configuration of the image composing apparatus according to the present invention.

FIG. 3 illustrates a basic configuration of the image mixing circuit in which two images are mixed with 10 combinations of factors obtainable using the expression (6).

The image mixing circuit has a multiplexer (MUX) 11 being a first means for selecting any of a fist image pixel value Cs, second image pixel value Cd or 0. The circuit also has multiplexers (MUX) 12 and 16. They are a second and third means for selecting any of a fist image pixel value Cs, second image pixel value Cd or 0.

Also the circuit has a multiplexer (MUX) 14. This is a fourth means for selecting any of an additional information component As of the first image, an additional information components Ad of the second image, and a fixed value fix.

The image composing circuit also comprises a subtractor 13 which works to calculate a difference between a pixel value A selected by MUX 11 and pixel value B selected by MUX 12.

Also the circuit comprises a multiplier 15 in which the result of subtraction from the subtractor 13 is multiplied by a mixing factor C from MUX 14.

The image composing circuit further comprises an adder 17 in which the result of multiplication from the multiplier 15 and a pixel value D from MUX 16 are added together.

The adder 17 will provide an output {(A−B)*C+D} (expression (6)). The output is produced by calculation of the expression (6) using any one of the 10 combinations of mixing factors. The expression (6) is calculated for each component as in the expression (7) below:

$$(A-B)*C+D=\{(A0-B0)*C0+D0, (A1-B1)*C1+D1, (A2-B2)*C2+D2, (A3-B3)*C3+D3\} \quad (7)$$

Figure 4:
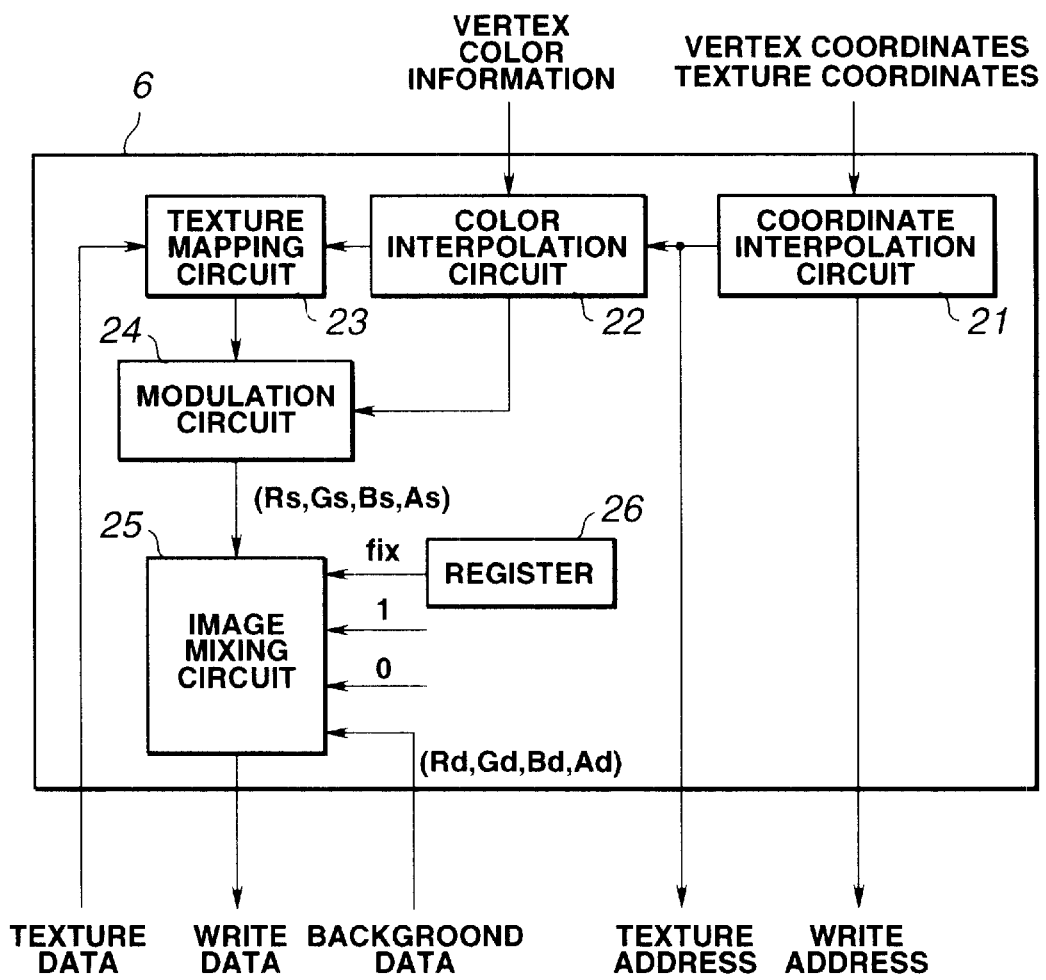
FIG. 4 is a block diagram of an embodiment of the present invention, showing an example of the configuration of the graphic processor (GPU)
Figure 5:
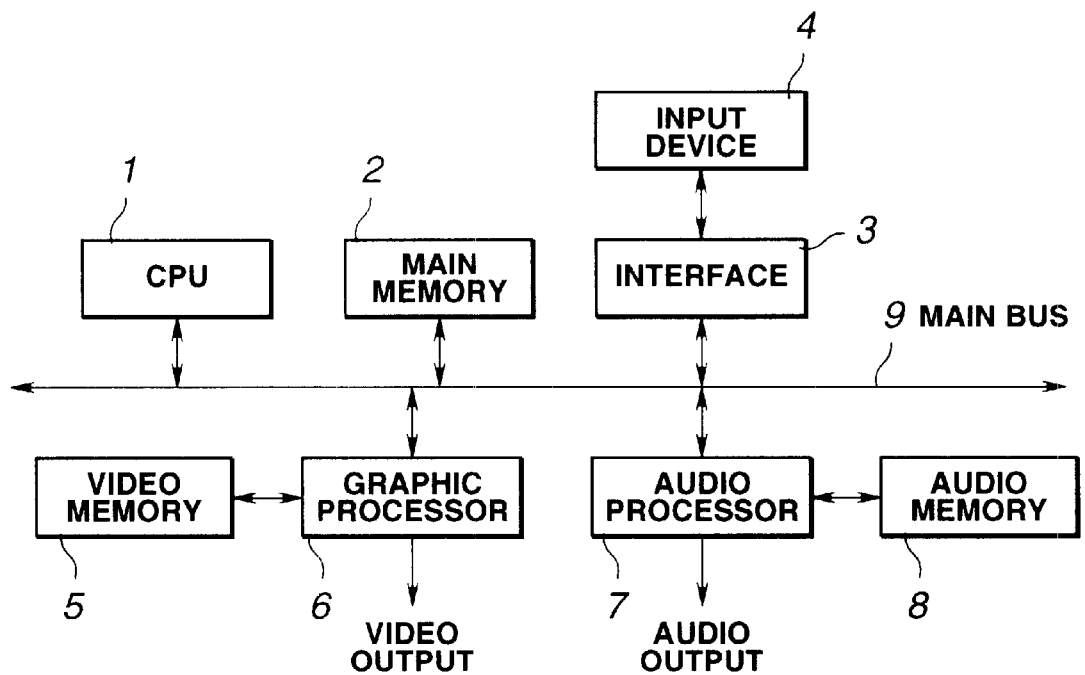
FIG. 5 is a block diagram of the image generating apparatus according to the present invention, showing an example of its configuration.

Because of this image mixing circuit according to the present invention, the multiplication circuits can be reduced in number as compared with the example of configuration in FIG. 5, which can lead to the design of the hardware in a small scale FIG. 4 shows an example of configuration of the graphic processor (GPU) composed by applying the aforementioned image composing method and apparatus of the present invention.

In FIG. 4, the graphic processor is generally indicated with a reference 6. Supplied with a vertex color information and vertex coordinate of an image, texture data and texture coordinate, and background data, the GPU 6 provides a write address and texture address, and write data.

The vertex information and coordinate are color information component and coordinate, respectively, of a pixel given, for image data generation, for each vertex of each of polygonal regions (so-called "polygons") as units to compose together an object to be displayed. The texture data and coordinate are data such as texture, pattern or the like pasted on the polygon to represent the pattern of the object surface and fine irregularities, and their coordinate values.

The operation of pasting the texture data to the polygon is called "texture mapping".

The GPU 6 comprises a coordinate interpolation circuit 21, color interpolation circuit 22, texture mapping circuit 23, modulation circuit 24, and an image mixer 25.

The coordinate interpolation circuit 21 interpolates supplied vertex coordinate and texture coordinate by linear interpolation, and provides a texture address for delivery to the color interpolation circuit 22. The circuit 21 also provides a write address.

Using the supplied vertex color information and the result of interpolation from the coordinate interpolation circuit 21, the color interpolation circuit 22 makes an interpolation of the color information by linear interpolation, etc. The result of this interpolation is passed to the texture mapping circuit 23 and modulation circuit 24.

Using the supplied texture data and the result of interpolation from the color interpolation circuit 21, the texture mapping circuit 23 effect a texture mapping. The result of the texture mapping is delivered to the modulation circuit 24.

In the modulation circuit 24, the result of interpolation from the color interpolation circuit 22 and the result of texture mapping from the texture mapping circuit 23 are used to modulate the image color and intensity as necessary. The result of this modulation (Rs, Gs, Bs, As) is supplied to the image mixer 25.

The image mixer 25 mixes images together according to the image composing method of the present invention. It has the image mixing circuit shown in FIG. 3. The image mixer 25 is supplied with a fixed value fix, values 0 and 0 from a register 26 which is also provided in the image composing apparatus of the present invention, and also with a background data (Rd, Gd, Bd, Ad) whose values are used to provide write data.

FIG. 5 shows an example of configuration of an image generating apparatus adopting the image composing method and apparatus of the present invention having been described in the foregoing. The image generating apparatus is suitably usable in a home game machine and the like in which it is necessary to display a three-dimensional image with a high accuracy and at a high speed.

The image generating apparatus comprises a central processing unit (CPU) being a microprocessor, CPU1. The CPU1 is provided to acquire information on the operation of an input device 4 such as an input pad or joystick via an interface 3 and main bus 9. Based on the information on the operation thus acquired, the CPU 1 send to the graphic processor (GPU) 6 via the main bus 9 the information of the three-dimensional image stored in a main memory 2 being a first memory of the image generating apparatus.

The GPU 6 transforms a received three-dimensional image information to generate an image data. It is provided with the aforementioned image mixing circuit of the present invention. The three-dimensional image formed from the image data generated by the GPU 6 is depicted on a video memory 5 being a second memory of the image generating apparatus.

Simultaneously with the display of the three-dimensional image as in the above, an audio information corresponding to the three-dimensional image and included in the information of the operation acquired by the CPU1, is sent to an audio processor 7 in which an audio data stored in an audio memory 8 is processed based on the received audio information and provided as an audio output.

As having been described in the foregoing, the present invention provides the image composing method and apparatus in which a mixing factor for one of two images to be mixed to compose a new image and a one for the other image are combined in 10 practically meaningful pairs and the number of time of multiplication is reduced so that calculation includes only a single subtraction, multiplication and addition each. Thus the present invention provides a image composing apparatus which has a reduced hardware scale while keeping the speed of calculation not reduced.

What is claimed is:

1. A method of combining a first video image and a second video image to produce a combined video image, said method comprising:

selecting a minuend comprising a first minuend component, a second minuend component, a third minuend component and a fourth minuend component from the group consisting of a first pixel value, a second pixel value and a zero pixel value, said first pixel value corresponding to a pixel from said first video image and comprising a red component corresponding to said first minuend component, a green component corresponding to said second minuend component, a blue component corresponding to said third minuend component and an alpha component corresponding to said fourth minuend component, said second pixel value corresponding to a pixel from said second video image and comprising a red component corresponding to said first minuend component, a green component corresponding to said second minuend component, a blue component corresponding to said third minuend component and an alpha component corresponding to said fourth minuend component, said zero pixel value comprising a first zero component corresponding to said first minuend component, a second zero component corresponding to said second minuend component, a third zero component corresponding to said third minuend component and a fourth zero component corresponding to said fourth minuend component;

selecting a subtrahend comprising a first subtrahend component, a second subtrahend component, a third subtrahend component and a fourth subtrahend component from the group consisting of said first pixel value, said second pixel value and said zero pixel value, said first subtrahend component corresponding to said first minuend component, said second subtrahend component corresponding to said second minuend component, said third subtrahend component corresponding to said third minuend component and said fourth subtrahend component corresponding to said fourth minuend component;

subtracting said first subtrahend component, said second subtrahend component, said third subtrahend component and said fourth subtrahend component from, respectively, said first minuend component, said second minuend component, said third minuend component and said fourth minuend component to produce, respectively, a first difference component, a second difference component, a third difference component and a fourth difference component;

selecting a first mixing factor comprising a first mixing component, a second mixing component, a third mixing component and a fourth mixing component, each of said mixing components having the same value, said same value being selected from the group consisting of the alpha component of said first pixel value, the alpha component of said second pixel value and a fixed value;

multiplying said first difference component, said second difference component, said third difference component and said fourth difference component by, respectively, said first mixing component, said second mixing component, said third mixing component and said fourth mixing component to produce, respectively, a first product component, a second product component, a third product component and a fourth product component;

selecting a blending factor comprising a first blending component, a second blending component, a third blending component and a fourth blending component from the group consisting of said first pixel value, said second pixel value and said zero pixel value, said first blending component corresponding to said first minuend component, said second blending component corresponding to said second minuend component, said third blending component corresponding to said third minuend component and said fourth blending component corresponding to said fourth minuend component;

adding said first product component, said second product component, said third product component and said fourth product component to, respectively, said first blending component, said second blending component, said third blending component and said fourth blending component to produce, respectively, a red value, a green value, a blue value and an alpha value for a pixel of said combined video image.

2. A system for combining a first video image and a second video image to produce a combined video image, said system comprising:

a multiplexer for selecting a minuend comprising a first minuend component, a second minuend component, a third minuend component and a fourth minuend component from the group consisting of a first pixel value, a second pixel value and a zero pixel value, said first pixel value corresponding to a pixel from said first video image and comprising a red component corresponding to said first minuend component, a green component corresponding to said second minuend component, a blue component corresponding to said third minuend component and an alpha component corresponding to said fourth minuend component, said second pixel value corresponding to a pixel from said second video image and comprising a red component corresponding to said first minuend component, a green component corresponding to said second minuend component, a blue component corresponding to said third minuend component and an alpha component corresponding to said fourth minuend component, said zero pixel value comprising a first zero component corresponding to said first minuend component, a second zero component corresponding to said second minuend component, a third zero component corresponding to said third minuend component and a fourth zero component corresponding to said fourth minuend component;

a multiplexer for selecting a subtrahend comprising a first subtrahend component, a second subtrahend component, a third subtrahend component and a fourth subtrahend component from the group consisting of said first pixel value, said second pixel value and said zero pixel value, said first subtrahend component corresponding to said first minuend component, said second subtrahend component corresponding to said second minuend component, said third subtrahend component corresponding to said third minuend component and said fourth subtrahend component corresponding to said fourth minuend component;

a subtracter for subtracting said first subtrahend component, said second subtrahend component, said third subtrahend component and said fourth subtrahend component from, respectively, said first minuend component, said second minuend component, said third minuend component and said fourth minuend component to produce, respectively, a first difference component, a second difference component, a third difference component and a fourth difference component;

a multiplexer for selecting a first mixing factor comprising a first mixing component, a second mixing component, a third mixing component and a fourth mixing component, each of said mixing components having the same value, said same value being selected from the group consisting of the alpha component of said first pixel value, the alpha component of said second pixel value and a fixed value;

a multiplier for multiplying said first difference component, said second difference component, said third difference component and said fourth difference component by, respectively, said first mixing component, said second mixing component, said third mixing component and said fourth mixing component to produce, respectively, a first product component, a second product component, a third product component and a fourth product component;

a multiplexer for selecting a blending factor comprising a first blending component, a second blending component, a third blending component and a fourth blending component from the group consisting of said first pixel value, said second pixel value and said zero pixel value, said first blending component corresponding to said first minuend component, said second blending component corresponding to said second minuend component, said third blending component corresponding to said third minuend component and said fourth blending component corresponding to said fourth minuend component;

an adder for adding said first product component, said second product component, said third product component and said fourth product component to, respectively, said first blending component, said second blending component, said third blending component and said fourth blending component to produce, respectively, a red value, a green value, a blue value and an alpha value for a pixel of said combined video image.

3. A computer-readable medium storing computer-executable software code for combining a first video image and a second video image to produce a combined video image, said code comprising:

code for selecting a minuend comprising a first minuend component, a second minuend component, a third minuend component and a fourth minuend component from the group consisting of a first pixel value, a second pixel value and a zero pixel value, said first pixel value corresponding to a pixel from said first video image and comprising a red component corresponding to said first minuend component, a green component corresponding to said second minuend component, a blue component corresponding to said third minuend component and an alpha component corresponding to said fourth minuend component, said second pixel value corresponding to a pixel from said second video image and comprising a red component corresponding to said first minuend component, a green component corresponding to said second minuend component, a blue component corresponding to said third minuend component and an alpha component corresponding to said fourth minuend component, said zero pixel value comprising a first zero component corresponding to said first minuend component, a second zero component corresponding to said second minuend component, a third zero component corresponding to said third minuend component and a fourth zero component corresponding to said fourth minuend component;

code for selecting a subtrahend comprising a first subtrahend component, a second subtrahend component, a third subtrahend component and a fourth subtrahend component from the group consisting of said first pixel value, said second pixel value and said zero pixel value, said first subtrahend component corresponding to said first minuend component, said second subtrahend component corresponding to said second minuend component, said third subtrahend component corresponding to said third minuend component and said fourth subtrahend component corresponding to said fourth minuend component;

code for subtracting said first subtrahend component, said second subtrahend component, said third subtrahend component and said fourth subtrahend component from, respectively, said first minuend component, said second minuend component, said third minuend component and said fourth minuend component to produce, respectively, a first difference component, a second difference component, a third difference component and a fourth difference component;

code for selecting a first mixing factor comprising a first mixing component, a second mixing component, a third mixing component and a fourth mixing component, each of said mixing components having the same value, said same value being selected from the group consisting of the alpha component of said first pixel value, the alpha component of said second pixel value and a fixed value;

code for multiplying said first difference component, said second difference component, said third difference component and said fourth difference component by, respectively, said first mixing component, said second mixing component, said third mixing component and said fourth mixing component to produce, respectively, a first product component, a second product component, a third product component and a fourth product component;

code for selecting a blending factor comprising a first blending component, a second blending component, a third blending component and a fourth blending component from the group consisting of said first pixel value, said second pixel value and said zero pixel value, said first blending component corresponding to said first minuend component, said second blending component corresponding to said second minuend component, said third blending component corresponding to said third minuend component and said fourth blending component corresponding to said fourth minuend component;

code for adding said first product component, said second product component, said third product component and said fourth product component to, respectively, said first blending component, said second blending component, said third blending component and said fourth blending component to produce, respectively, a red value, a green value, a blue value and an alpha value for a pixel of said combined video image.

4. A method for use in performing image processing, the method comprising the steps of;

defining a set of image combinations, wherein the set of combinations are a first combination, $(Cs-Cd)*As+Cd$, wherein Cs is a pixel value of a first image, Cd is a pixel value of a second image, and As is alpha information for the pixel of the first image;

a second combination, $(Cd-Cs)*Ad+Cs$, wherein Ad is alpha information for the pixel in the second image;

a third combination, $(Cs-Cd)*fix+Cd$, wherein fix is a value for a fixed mixing factor;

a fourth combination, $(Cs-0)*fix+Cd$;

a fifth combination, $(Cs-0)*As+Cd$;

a sixth combination, $(0-Cs)*fix+Cd$;

a seventh combination, $(0-Cs)*As+Cd$;

an eighth combination, $(0-Cd)*fix+Cs$;

a ninth combination, $(Cs-0)*As+0$;

a tenth combination, $(Cs-0)*1+Cd$; and selecting one of the combinations from the defined set of image combinations; and mixing pixels of at least the first image and the second image in accordance with the selected combination for providing a mixed image, such that only a single multiplication is required for determining component values of a resulting pixel of the mixed image.

5. Apparatus for use in performing image processing, the apparatus comprising;

a first multiplexer having a first output signal and at least three input signals comprising Cs, which is a pixel value of a first image, Cd, which is a pixel value of a second image, and a signal representing a zero value;

a second multiplexer having a second output signal and at least three input signals comprising Cs, Cd, and the zero signal;

a third multiplexer having a third output signal and at least three input signals comprising As, which is alpha information for the pixel of the first image, Ad, which is alpha image for the pixel of the second image, and a fix signal, which represents a fixed value;

a fourth multiplexer having a fourth output signal and at least three input signals comprising Cs, Cd, and the zero signal; and circuitry for producing a composite image by adding the fourth output signal to a product of a multiplication between the third output signal and a difference between the first output signal and the second output signal;

wherein each of the multiplexers determine their respective output signals by selecting one of their respective input signals to mix pixels of the first image and the second image in accordance with a selected one of ten mixing combinations, wherein the ten mixing combinations are:

a first combination, $(Cs-Cd)*As+Cd$;

a second combination, $(Cd-Cs)*Ad+Cs$;

a third combination, $(Cs-Cd)*fix+Cd$;

a fourth combination, $(Cs-0)*fix+Cd$;

a fifth combination, $(Cs-0)*As+Cd$;

a sixth combination, $(0-Cs)*fix+Cd$;

a seventh combination, $(0-Cs)*As+Cd$;

an eighth combination, $(0-Cd)*fix+Cs$;

a ninth combination, $(Cs-0)*As+0$; and a tenth combination, $(Cs-0)*1+Cd$.

6. A computer-readable medium storing computer-executable software code for combining a first image and a second image to produce a combined image, said code comprising:

code for selecting one of at least three input values as a first output value, the at least three input values comprising Cs, which is a pixel value of the first image, Cd, which is a pixel value of the second image, and a value of zero;

code for selecting one of at least three input values as a second output value, the at least three input values comprising Cs, Cd, and the value of zero;

code for selecting one of at least three input values as a third output value, the at least three input values comprising As, which is alpha information for the pixel of the first image, Ad, which is alpha image for the pixel of the second image, and a fixed value;

code for selecting one of at least three input values as a fourth output value, the at least three input values comprising Cs, Cd, and the value of zero; and code for producing the combined image by adding the fourth output value to a product of a multiplication between the third output value and a difference between the first output value and the second output value;

wherein each of the codes for selecting elements performs the selection of their respective input signals to mix pixels of the first image and the second image in accordance with a selected one of ten mixing combinations, wherein the ten mixing combinations are:

a first combination, $(Cs-Cd)*As+Cd$;

a second combination, $(Cd-Cs)*Ad+Cs$;

a third combination, $(Cs-Cd)*fix+Cd$;

a fourth combination, $(Cs-0)*fix+Cd$;

a fifth combination, $(Cs-0)*As+Cd$;

a sixth combination, $(0-Cs)*fix+Cd$;

a seventh combination, $(0-Cs)*As+Cd$;

an eighth combination, $(0-Cd)*fix+Cs$;

a ninth combination, $(Cs-0)*As+0$; and a tenth combination, $(Cs-0)*1+Cd$.

* * * * *

UNITED STATES PATENT AND TRADEMARK OFFICE
CERTIFICATE OF CORRECTION

PATENT NO. : 6,567,096 B1
DATED : May 20, 2003
INVENTOR(S) : Masaaki Oka et al.

It is certified that error appears in the above-identified patent and that said Letters Patent is hereby corrected as shown below:

Title page,
Item [57], ABSTRACT,
Line 10, "In a adding" should read -- In an adding --.

Column 2,
Line 35, "image" should read -- images --.
Line 44, "use" should read -- uses --.

Column 5,
Lines 65 and 66, "combination" should read -- combinations --.

Column 6,
Line 37, "D Cd" should read -- D=Cd --.

Column 7,
Lines 27 and 30, "fist" should read -- first --.
Line 35, "components" should read -- component --.
Line 58, after "scale" insert a period.

Column 8,
Line 38, "0 and 0" should read -- 1 and 0 --.
Line 55, "send" should read -- sends --.

Column 9,
Line 11, "time" should read -- times --.
Line 13, "a image" should read -- an image --.

Signed and Sealed this

Twenty-first Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,567,096 B1  Page 1 of 1
DATED : May 20, 2003
INVENTOR(S) : Masaaki Oka et al.

It is certified that error appears in the above-identified patent and that said Letters Patent is hereby corrected as shown below:

<u>Title page,</u>
Item [73], Assignee, insert -- Kabushiki Kaisha Toshiba (JP) --

Signed and Sealed this

Twentieth Day of January, 2004

JON W. DUDAS
*Acting Director of the United States Patent and Trademark Office*